US005694526A

United States Patent [19]

[11] Patent Number: 5,694,526

[45] Date of Patent: Dec. 2, 1997

Emmett et al.

[54] POSTAGE METER HAVING A DOT MATRIX PRINTER

[75] Inventors: James S. Emmett, Derby; John J. Horbal, Beacon Falls, both of Conn.

[73] Assignee: Micro General Corporation, Santa Ana, Calif.

[21] Appl. No.: 630,744

[22] Filed: Apr. 10, 1996

[51] Int. Cl.$^{6}$ .................... G06K 15/00

[52] U.S. Cl. .................... 395/108; 364/464.18

[58] Field of Search .................... 395/108, 114, 395/115, 116, 101; 364/464.02, 464.03, 464.18; 347/175, 180; 400/247, 124, 82

[56] References Cited

U.S. PATENT DOCUMENTS

| | | | |
|---|---|---|---|
| Re. 31,875 | 4/1985 | Check, Jr. et al. | 364/464.18 |
| 4,393,386 | 7/1983 | Di Giulio | 346/75 |
| 4,483,633 | 11/1984 | Kosner, Jr. et al. | 400/82 |
| 4,493,252 | 1/1985 | Clark | 101/71 |
| 4,660,052 | 4/1987 | Kaiya et al. | 346/76 |
| 4,741,636 | 5/1988 | Takahashi et al. | 400/124 |
| 4,814,790 | 3/1989 | Nitta | 347/175 |
| 4,831,554 | 5/1989 | Storace et al. | 364/464.02 |
| 4,868,757 | 9/1989 | Gil | 364/464.03 |
| 5,003,323 | 3/1991 | Onuki et al. | 346/76 |
| 5,039,237 | 8/1991 | Tanuma et al. | 400/124 |
| 5,078,520 | 1/1992 | Yano et al. | 395/108 |
| 5,154,521 | 10/1992 | Tanaka et al. | 400/247 |
| 5,229,788 | 7/1993 | Shimada et al. | 346/76 |
| 5,326,181 | 7/1994 | Eisner et al. | 400/104 |
| 5,355,441 | 10/1994 | Kawai et al. | 395/115 |

*Primary Examiner*—William Cumming
*Assistant Examiner*—Tracy M. Legree
*Attorney, Agent, or Firm*—Fitzpatrick, Cella, Harper & Scinto

[57] ABSTRACT

A postage meter includes a keyboard for inputting postage information, a memory for storing the input postage information, a programmable read-only memory for storing standard postage indicia information, a dot matrix printer, the dot matrix printer comprising a staggered arrangement of a plurality of dot matrix printheads, and a controller which 1) retrieves the input postage information and the standard postage indicia, 2) combines the input postage information and the standard postage indicia information to form a postage indicia to be printed, 3) divides the formed postage indicia into equal portions wherein the formed postage indicia is divided by a number of the dot matrix printheads in the dot matrix printer, 4) routes divided portions to each of a plurality of dot matrix printheads, and 5) instructs each of the dot matrix printheads to print its portion of the divided postage indicia at a specific time such that upon completing the printing of the divided portion, a complete postage indicia is printed.

5 Claims, 8 Drawing Sheets

POSTAGE METER HAVING A DOT MATRIX PRINTER

BACKGROUND OF THE INVENTION

1. Field of the Invention

The present invention relates to a postage meter having a dot matrix postal indicia printer for printing, pixel by pixel, postage indicia as well as for printing PostNet bar codes. In particular, the present invention relates to a postage meter having a staggered arrangement of six dot matrix printheads which when combined print a ¾" high postage indicia onto an adhesive label. This is accomplished by having each of the six dot matrix printheads print a ⅛" band of the total ¾" postage indicia onto an adhesive label which, after printing, is separated from its backing and pressed against a mailpiece conveyed through the postage meter.

2. Description of the Related Art

Conventionally, postage meters use a rotary drum with an engraved printing die to print both a postage indicia and postage amount. Recently, however, the U.S. Postal Service has approved postage meters which use digital data printing technology, for example, thermal transfer printing technology, to generate postal indicia, and has recently indicated that in the near future, only digital printing will be allowed.

The use of an impact dot matrix printhead in a postage meter has been suggested such as in U.S. Pat. No. 4,493,252 for printing a portion of the indicia which changes, such as the postage value and date, while printing the constant portion with the conventional engraved printing dye carried on a rotary drum. However, the drawback of this system is it is limited to printing a ⅛ band and requires a traversing mechanism or other arrangement in order to print an entire ¾" postal indicia which includes both the postage value, date and U.S. postal indicia. This makes conventional systems more complex, expensive and less compact.

Accordingly, there exists a need to be able to print an entire postage indicia which includes postage value, date and U.S. postal indicia utilizing a dot matrix printer arrangement which is compact and inexpensive.

SUMMARY OF THE INVENTION

The foregoing needs are addressed by the present invention which provides a postage meter having a series of dot matrix printheads which are positioned in a semicircular, horizontally staggered arrangement and which are vertically offset, such that when each of the dot matrix printheads prints its ⅛" vertical highband, the combination of bands produces a ¾" high postage indicia and postage value.

According to the present invention, a postage meter includes a keyboard for inputting postage information, a memory for storing the input postage information, a programmable read-only memory for storing standard postage indicia information, a dot matrix printer, the dot matrix printer comprising a staggered arrangement of a plurality of dot matrix printheads, and a controller which 1) retrieves the input postage information and the standard postage indicia, 2) combines the input postage information and the standard postage indicia information to form a postage indicia to be printed, 3) divides the formed postage indicia into equal portions wherein the formed postage indicia is divided by a number of the dot matrix printheads in the dot matrix printer, 4) routes divided portions to each of a plurality of dot matrix printheads, and 5) instructs each of the dot matrix printheads to print its portion of the divided postage indicia at a specific time such that upon completing the printing of the divided portion, a complete postage indicia is printed.

This brief summary of the invention has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
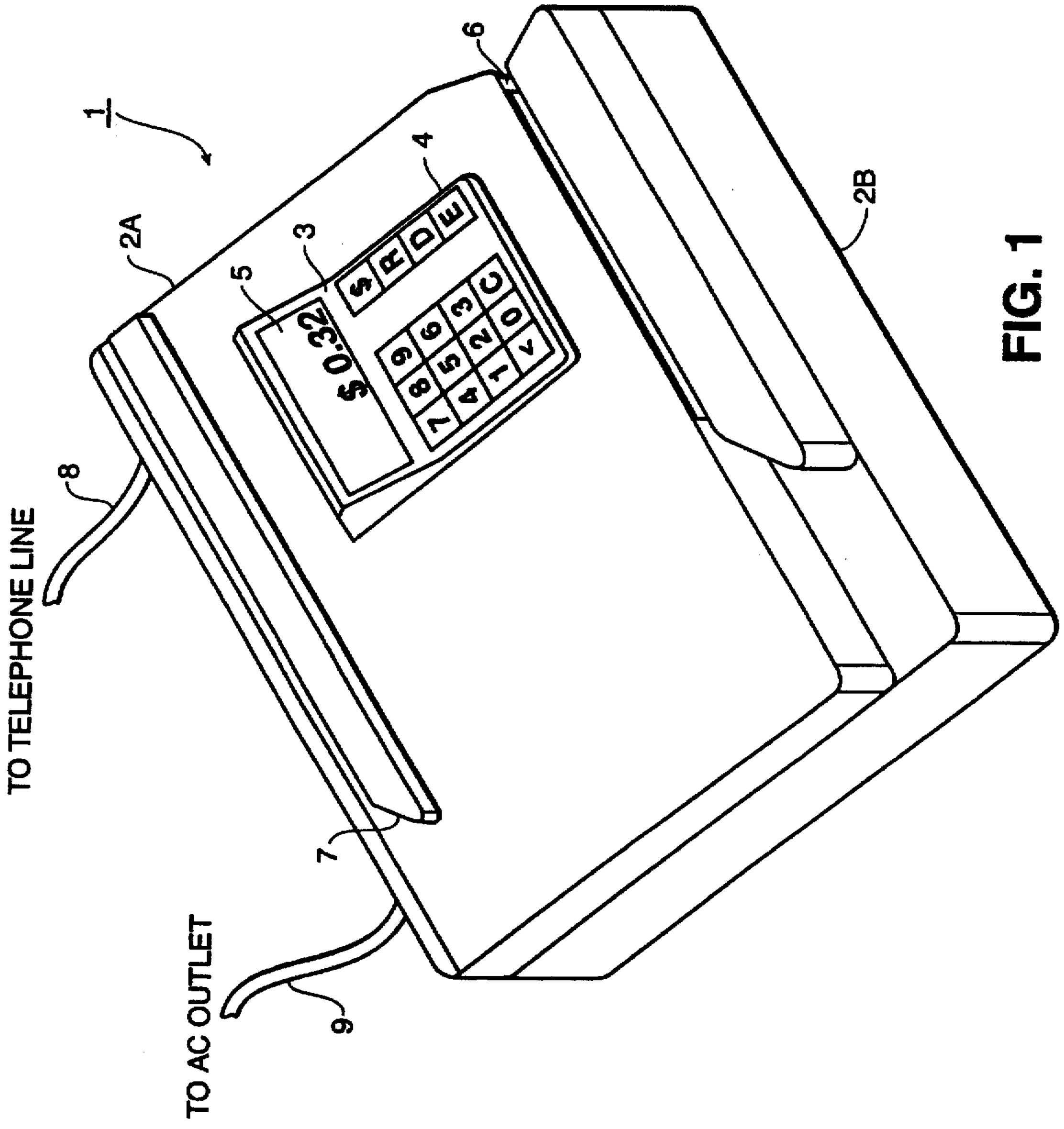
FIG. 1 is a perspective view showing the outward appearance of an apparatus according to the present invention.

FIG. 1 is a view showing an outward appearance of a representative embodiment of the invention. Shown in FIG. 1 is postage meter 1 having a detachably mounted upper housing 2A and a lower housing 2B. Upper housing 2A houses user interface 3 which includes keypad 4 and display 5, such as a liquid crystal display. User interface 3 is used by the user to manually input postage value, date, mailing method, such as first class, second class, airmail, etc., by using keypad 3. In use, after each user entry is input, the entry is displayed on display 5 to the user for approval.

Postage meter 1 includes envelope guide 6 for conveying an envelope through postage meter 1 to a label application position at which point a postage label imprinted with the appropriate postage amount and indicia is adhered to the envelope. Postage meter 1 also includes card reader 7 which can read the magnetic strip on the back of a debit card, a credit card or the like. In this manner, the postage meter can be recharged with postage by reading the debit card, transferring the debit card information to a remote location and debiting an account associated with the debit card.

Postage meter 1 further includes telephone line 8 which is used by the postage meter 1 to send requests to increase the postage meter via an internal modem (not shown) to a remote postage service station. Also attached is electrical connection 9 which provides power to postage meter 1.

Figure 2:
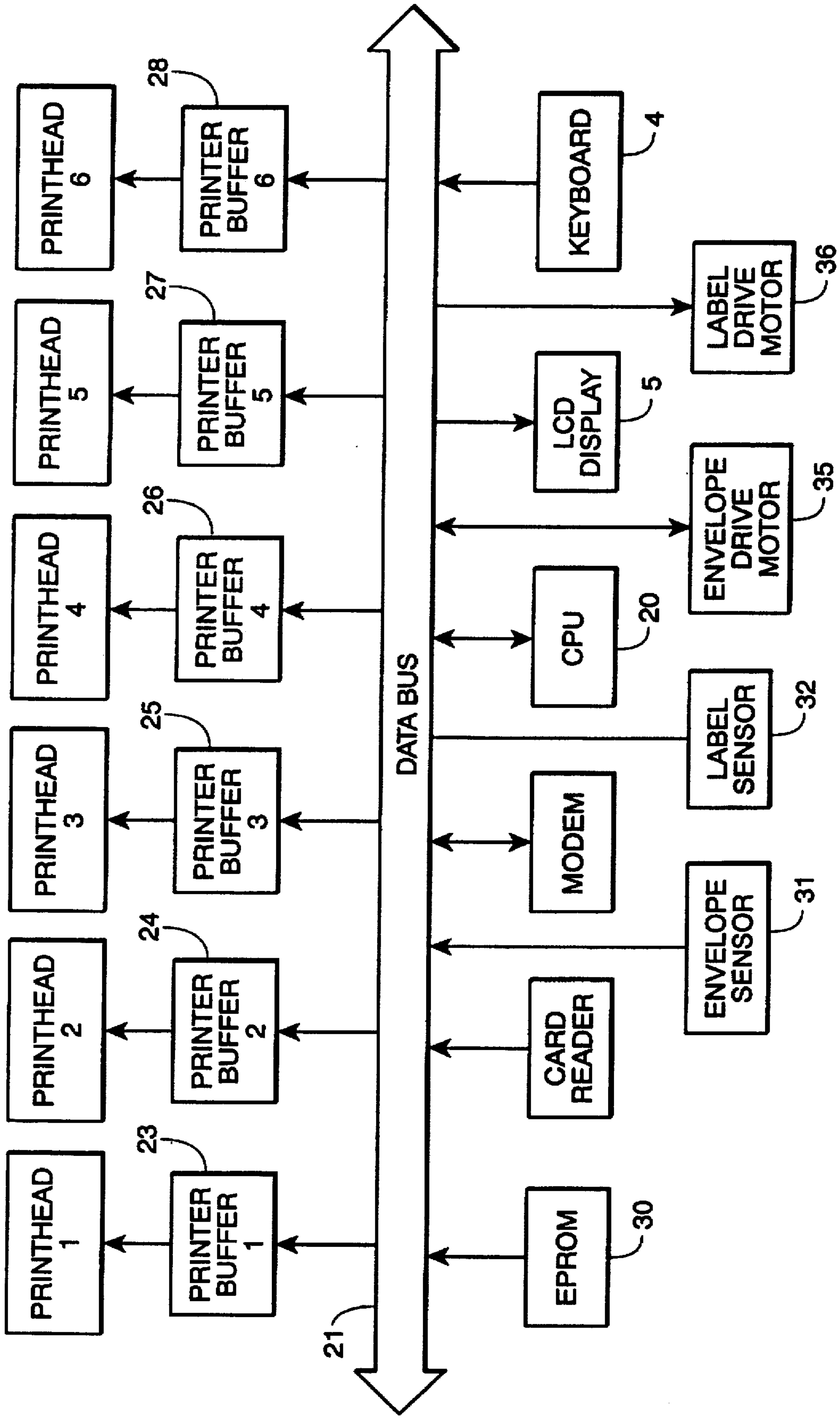
FIG. 2 is a block diagram of the FIG. 1 apparatus.

FIG. 2 is a detailed block diagram showing the internal construction of postage meter 1. As shown in FIG. 2, postage meter 1 includes a central processing unit (CPU) 20 interfaced with computer bus 21. CPU 20 has an internal cache/RAM and ROM, both of which are not shown. Also interfaced with computer bus 21 are printer buffers 23–28 which store print data for respective dot matrix printhead 1–6, respectively, keyboard interface 4, LCD display interface 5, and EPROM 30. In operation, CPU 20 retrieves stored information, such as print information, postage information and communication information from EPROM 30 in order to perform various functions of postage meter 1, such as printing postage indica and recharging the postage in postage meter 1.

FIG. 2 also shows envelope sensor interface 31 which sends a signal, via computer bus 21 to CPU 20 in response to a sensor outputting a signal which indicates that a leading edge of an envelope has been inserted into guide 6. Label sensor interface 32 outputs a signal to CPU 20 in response to a label sensor outputting a signal which indicates that a label has reached an ejecting point. In operation, when CPU 20 receives a signal output from sensor 31, CPU 20 outputs a signal to envelope drive motor interface 35 and label drive motor interface 36 so as to ensure synchronization of the movement of a mailpiece along guide 6 and the printing of a postage indicia onto a label such that the envelope is present at the same time the label is at the ejecting point.

Figure 3:
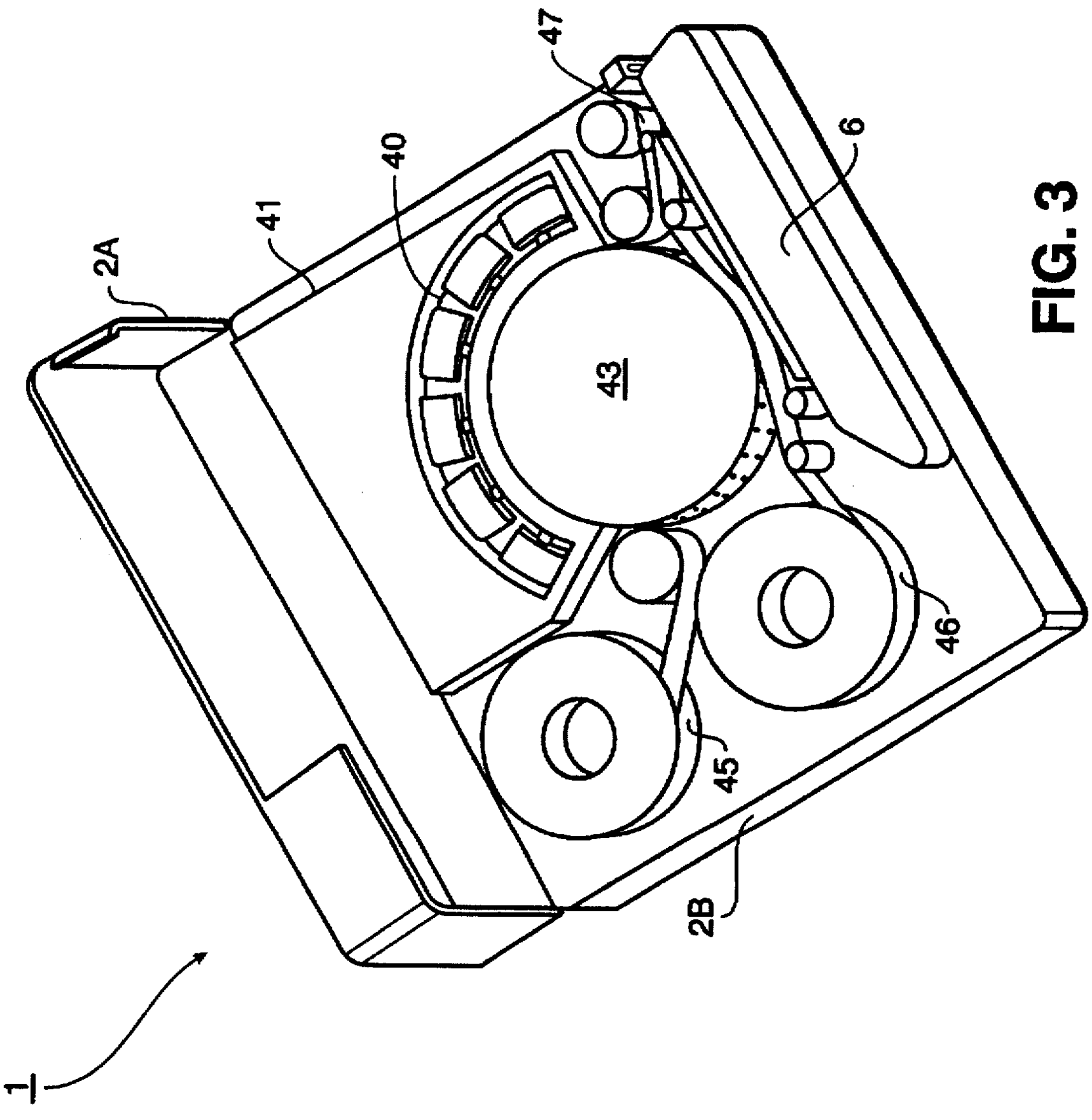
FIG. 3 is a perspective view showing the internal mechanisms of the apparatus of the present invention.

FIG. 3 is a representational view of postage meter 1 with the upper housing 2A removed from base portion 2B. As shown in FIG. 3, mounted within base portion 2B is printer arrangement 40 which comprises six dot matrix printers arranged in a horizontal semicircular fashion. In the arrangement shown in FIG. 3, from left to right, each dot matrix printer is vertically offset by ⅛". In this manner, when each dot matrix printer prints its ⅛" band, the total of the bands will be a ¾" high postage indicia.

Also shown in FIG. 3 is ribbon cassette 41. Ribbon cassette 41 services all six dot matrix printers and is disposed between dot matrix printer arrangement 40 and circular platen 43. Ribbon cassette 41 will be described below in greater detail.

As shown in FIG. 3, postage meter 1 is designed to print a ¾" high postage indicia on adhesive labels which are subsequently applied to mailpieces. The labels carried in supply roll 45 supplies the carrier strip of labels to circular platen 43. Take-up reel 46 gathers the carrier strip after a printed label has been removed. Because adhesive labels are arranged sequentially on the carrier strip, supply roll 45, circular platen 43 and take-up reel 46 are designed to reverse so that once a postage indicia has been printed on a leading label, the next or subsequent label, following the leading label which has been printed on, will be reversed back to the first printhead printing position after the leading label has been ejected. In this manner, the next label will be positioned at the lead printhead of dot matrix printer arrangement 40 to await printing of the next postage indicia.

Figure 4:
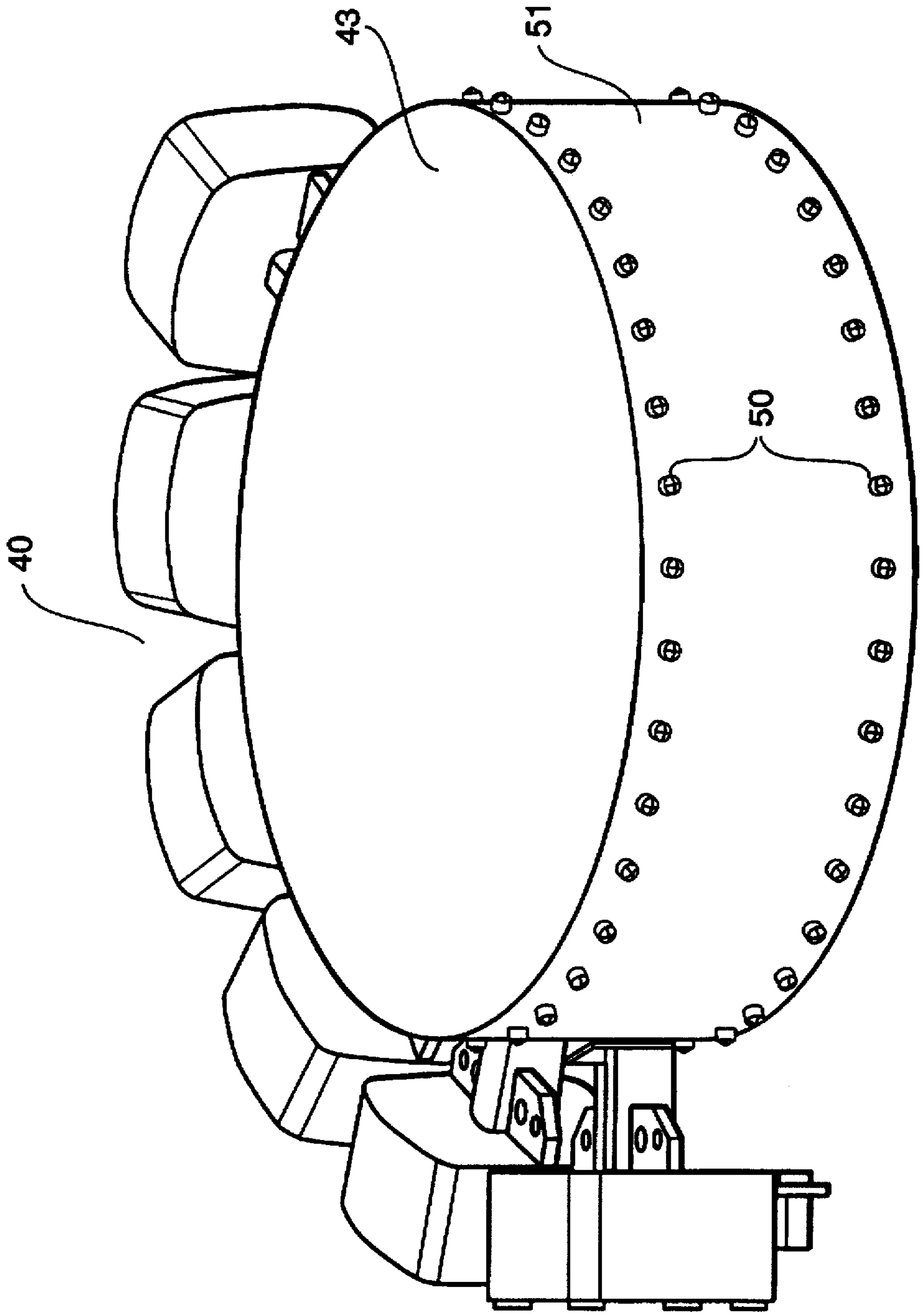
FIG. 4 is a representational view showing the dot matrix printheads arranged in a semi-circular staggered arrangement around circular platen.

FIG. 4 shows a perspective view of dot matrix printhead arrangement 40 positioned around circular platen 43. As shown in FIG. 4, circular platen 43 has sprocket pins 50 which assure accurate positioning movement of labels carried on the carrier strip and to enhance the reversible feature of circuit platen 43. In this regard, postage meter 1 accepts commercially available rolls of labels which have standard pinholes of ⅛ inch diameter on ½ inch centers in the carrier strip of which fit sprocket pins 50 on circular platen 43.

Figure 5:
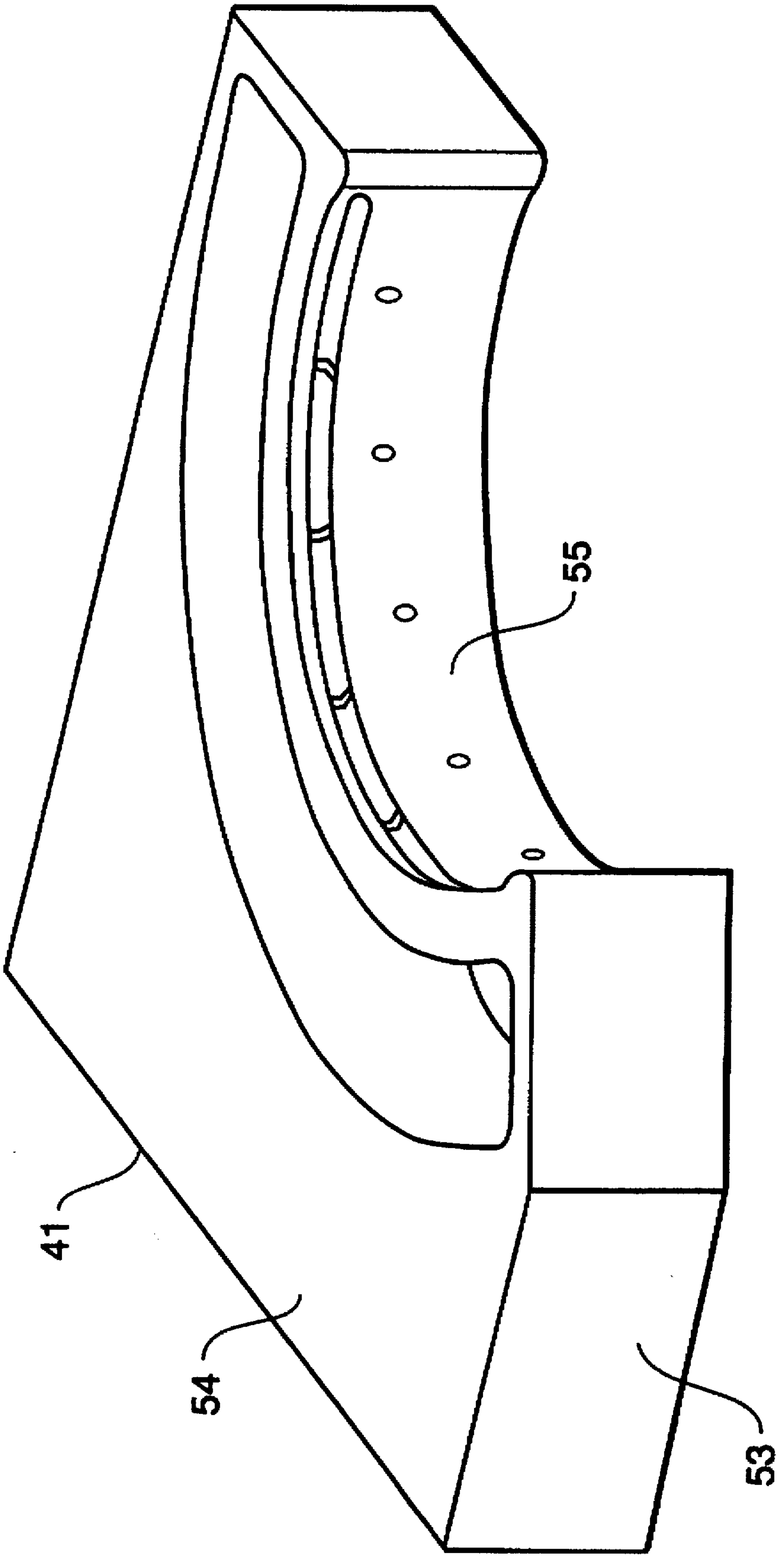
FIG. 5 is a representational view of the single ribbon cassette used to service the dot matrix printheads.

FIG. 5 ia a detailed view of ribbon cassette 41. To enable the most compact arrangement for dot matrix printer arrangement 40, ribbon cassette 41 includes a single ribbon which services all six dot matrix printheads. Ribbon cassette 41 consists of a plastic chassis 53 and plastic top cover 54. Provided in front of the inked ribbon is metal screen 55 which includes openings for each dot matrix printhead. Ribbon cassette 41 also includes ribbon rollers, an endless ribbon which can be reused over and over, an ink-filled foam re-inking station (all of which are not shown). The ink used by ribbon cassette 41 may be of any color and florescence as required by the postal service in the country of use.

Figure 6:
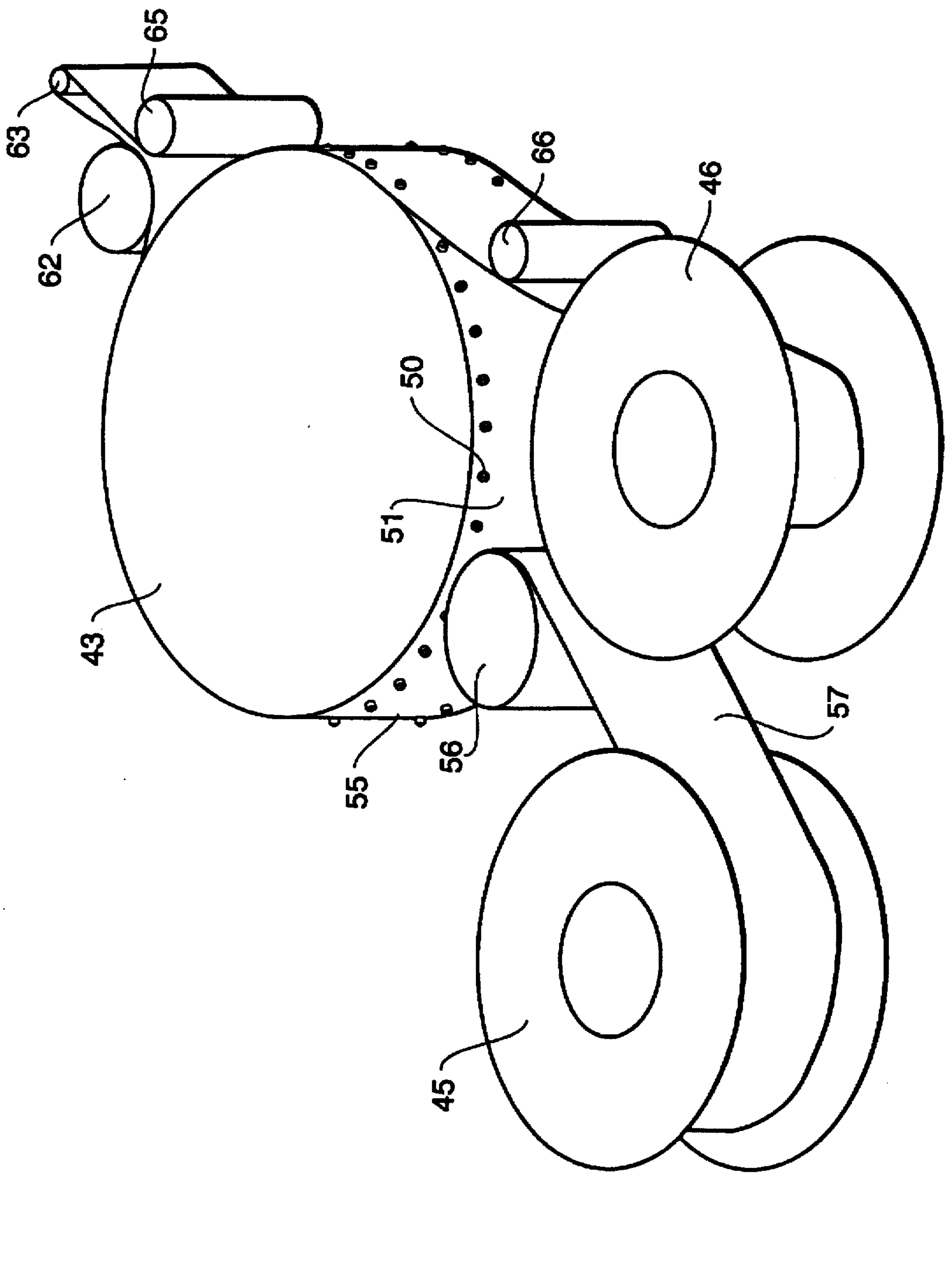
FIG. 6 is a representational view showing the arrangement by which adhesive labels are fed past the staggered arrangement of dot matrix printheads along the circular platen.

FIG. 6 illustrates how labels carried on carrier strip 57 are conveyed by circular platen 43 past dot matrix printer arrangement 40. As discussed previously, supply roller 45 contains a supply of labels on carrier strip 57, and from supply roller 45, label carrier strip 47 wraps around large idler roller 56 and from there is threaded onto sprockets 50 on platen 43. Carrier strip 57 passes between platen 43 and metal screen 55 of ribbon cassette 41. Upon emerging, carrier strip 57 makes a partial turn around large idler roller 62 and then reverses direction around small idler roller 63 which is tensioned by spring-loaded idler roller 65. Carrier strip 57 passes back onto sprockets 51 of circular platen 43 so as to provide the appropriate drive speed through the previous rollers and then past tension idler roller 66 onto take-up reel 46.

Now a detailed description as to how postage indicia is printed onto adhesive labels and either applied to an envelope directly or ejected for manual placement onto a mailpiece by a user will be described below with respect to FIGS. 1, 2, 7 and 8.

Upon inputting a postage amount via keyboard 4, the user's input information is directed by CPU 20, via databus 21, to LCD display 5, and the postage amount is displayed to the user for confirmation. When the user confirms the input information by pushing the enter key on keyboard 4, CPU 20 initiates the printing operation.

Once all postage information has been entered, CPU 20 stores the entered information in temporary on-chip cache or RAM. Because the entered information only makes up only a portion of the total postage indicia, CPU 20 retrieves from EPROM 30 additional postal indicia information to form the entire postage indicia, postage value, and date. All print information is then combined and divided by CPU 20 into six equal portions which is the same number of printheads on the dot matrix printer arrangement 40. Specifically, CPU 20 combines the standard postal indicia from EPROM 30 with the input postage value and date so as to form a total postal indicia image to be printed. Upon combining the data, CPU 20 divides the image from beginning to end into six equal portions or into any number of portions which is equivalent to the number of printheads used in the postage meter. Thereafter, CPU 20 serially outputs each portion with a print timing to each printhead's printer buffers. In this regard, the manner of dividing and outputting print data to the printheads is being omitted for purposes of brevity since it is believed that one of ordinary skill in the art would know how to disperse the print information such that a single image could be printed from a plurality of printheads, for example, U.S. Pat. No. 4,483,633 discloses such a method.

Upon storing print information in printer buffers 23, 24, 25, 26, 27 and 28, CPU 20 coordinates the label movement with the printing action of each printhead such that each printhead prints a ⅛" band of a total ¾" postage indicia. Once the print information is stored in each of the printer buffers, CPU 20 initiates the printing operation by providing a print operation timing for each of the printheads.

When CPU 20 sends the signal to print, drive motor 36 sends a signal to advance the labels along circular platen 43 to the first printing position. Upon arriving at the first printing position, printhead 1 prints its ⅛" band of the postage indicia. Upon completing its printing, a signal is sent back to CPU 20 and CPU 20 sends a signal for label drive motor 36 to advance the circular platen 43 to the second print position and printhead 2 prints its ⅛" band. In this regard, the label is conveyed along circular platen 43 for each of the remaining printheads in a similar fashion until the entire postal indicia image is printed.

Figure 7:
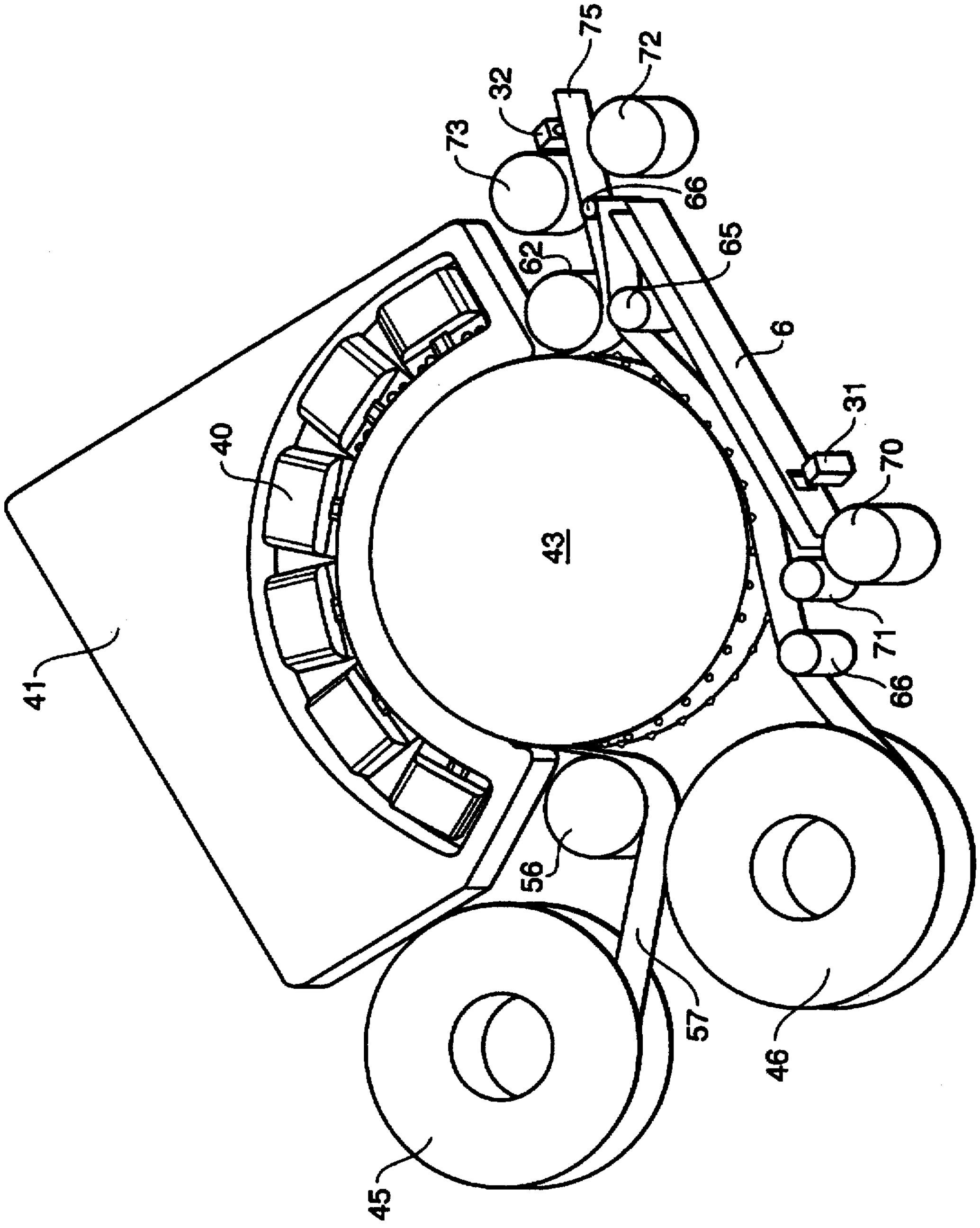
FIG. 7 is a representational view showing how a postal indicia is printed onto an adhesive label, how the label is peeled from its backing, and how the label is prepared for adhering to an envelope or for retrieval by an operator.

Referring to FIG. 7, after being printed with an appropriate postage amount, date and standard postage indicia, the printed label is advanced along a circular path by circular platen 43. According to the present invention, when carrier strip 57 passes around small diameter roller 66, the stiffer label carried on carrier strip 57 separates from its backing and continues past sensor 32.

Figure 8:
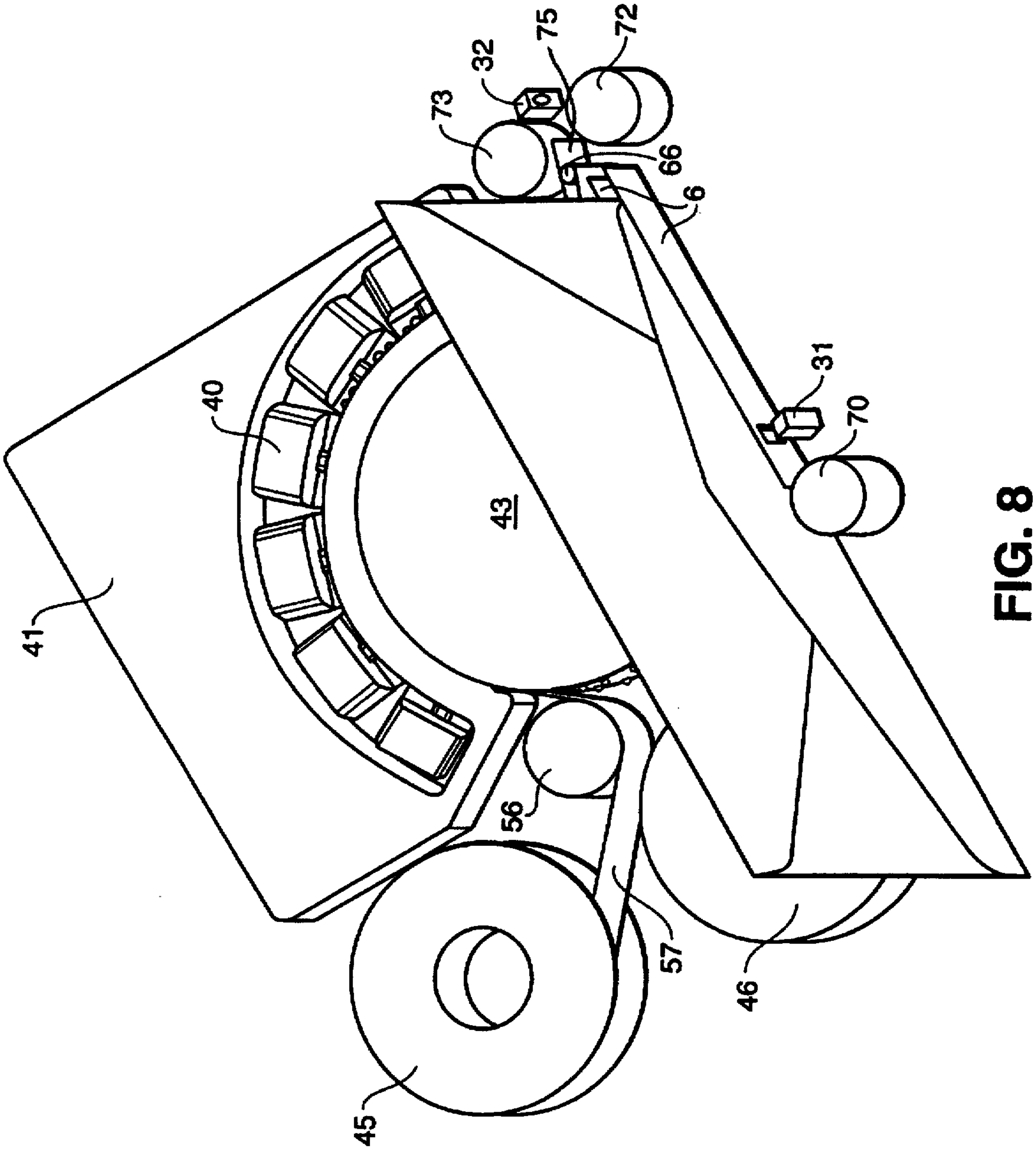
FIG. 8 shows the FIG. 7 arrangement in operation with a mailpiece.

If, as shown in FIG. 8, an envelope has been introduced into envelope guide 6, envelope sensor 31 will be triggered, the envelope will be transported through the guides by movable drive roller 70 and 71 in response to an output signal from sensor 32. At the end of guide 6, movable drive rollers 72 and 73 will press the envelope against the label and press both against idler roller 72 adhering label 75 to the envelope and further ejecting them. However, in the case that no mailpiece is inserted between guides 6, the carrier strip will halt with label 75 presented for easy retrieval by an operator for adhering to a package or oversized mail. Sensor 32 inhibits further operation until the presented label has been removed.

What is claimed is:

1. A postage meter, comprising:

a keyboard for inputting postage information;

a memory for storing the input postage information;

a programmable read-only memory for storing standard postage indicia information;

a dot matrix printer, said dot matrix printer comprising a staggered arrangement of a plurality of dot matrix printheads;

a controller which 1) retrieves the input postage information and the standard postage indicia, 2) combines the input postage information and the standard postage indicia information to form a postage indicia to be printed, 3) divides the formed postage indicia into equal portions wherein the formed postage indicia is divided by a number of the dot matrix printheads in the dot matrix printer, 4) routes divided portions to each of a plurality of dot matrix printheads, and 5) instructs each of the dot matrix printheads to print its portion of the divided postage indicia at a specific time such that upon completing the printing of the divided portion, a complete postage indicia is printed;

a label dispenser which is controlled by the controller to dispense an adhesive label to the dot matrix printer so as to be printed on by each of the plurality of dot matrix printheads in order to form a complete postage indicia; and a circular platen onto which the label dispenser dispenses an adhesive label to the dot matrix printer, said circular platen carrying the label and rotating the label past each of the dot matrix printers in sequence with the printing by each dot matrix printer.

2. A postage meter according to claim 1, further comprising a ribbon cassette, said ribbon cassette including a single printer ribbon which services the plurality of dot matrix printheads and is disposed between the printheads and the circular platen.

3. The postage meter according to claim 1, wherein the dot matrix printer further comprises a plurality of printer buffers, each of said plurality of printer buffers providing temporary storage of print information for its respective printhead.

4. The postage meter according to claim 1, wherein the dot matrix printer comprises six dot matrix printheads arranged in a horizontal, semicircular fashion and arranged in a vertical offset from each other by ⅛" and wherein each dot matrix printhead prints a ⅛" band such that when the six dot matrix printheads print, a total band of ¾" high is formed.

5. In a postage meter having a dot matrix printer, comprising a series of dot matrix printheads arranged horizontally in a semicircular fashion around a common access and arranged in a vertical offset, a method for printing postage information onto a label comprising the steps of:

inputting postage information;

retrieving standard postage indicia information from memory;

combining the postage information and the standard postage indicia information so as to form a postage indicia;

dividing the combined postage indicia equally by a number of dot matrix printheads in the dot matrix printer;

transmitting the divided postage information to each of the dot matrix printheads such that each dot matrix printhead receives an equal portion of the divided postage indicia;

dispensing to a circular platen an adhesive label from a label dispenser, wherein said circular platen carries the label and rotates the label past each of the dot matrix printers in sequence with the printing by each dot matrix printer;

staggering the printing of the divided portions of the postage indicia by each of the dot matrix printheads in accordance with a specified print timing onto a label carried by the circular platen; and outputting a label with a printed postage indicia.

* * * * *